(12) United States Patent
Cooper et al.

(10) Patent No.: US 8,057,951 B2
(45) Date of Patent: Nov. 15, 2011

(54) SOLID OXIDE FUEL CELL PROCESS AND APPARATUS

(75) Inventors: Matthew Ellis Cooper, Morgantown, WV (US); David J. Bayless, Athens, OH (US); Jason P. Trembly, Durham, NC (US)

(73) Assignee: Ohio University, Athens, OH (US)

( * ) Notice: Subject to any disclaimer, the term of this patent is extended or adjusted under 35 U.S.C. 154(b) by 611 days.

(21) Appl. No.: 12/294,337

(22) PCT Filed: Mar. 28, 2007

(86) PCT No.: PCT/US2007/065349
§ 371 (c)(1),
(2), (4) Date: Sep. 24, 2008

(87) PCT Pub. No.: WO2007/112435
PCT Pub. Date: Oct. 4, 2007

(65) Prior Publication Data
US 2009/0252999 A1    Oct. 8, 2009

Related U.S. Application Data

(60) Provisional application No. 60/786,640, filed on Mar. 28, 2006.

(51) Int. Cl.
*H01M 8/10* (2006.01)
*H01M 8/04* (2006.01)
*H01M 8/06* (2006.01)
*H01M 8/00* (2006.01)

(52) U.S. Cl. ........ 429/479; 429/484; 429/485; 429/486; 429/487; 429/488; 429/490; 429/502; 429/505

(58) Field of Classification Search .......................... None
See application file for complete search history.

(56) References Cited

U.S. PATENT DOCUMENTS

| | | | | |
|---|---|---|---|---|
| 4,920,015 A | * | 4/1990 | Sammells | 429/442 |
| 5,021,304 A | | 6/1991 | Ruka et al. | |
| 5,589,285 A | * | 12/1996 | Cable et al. | 429/479 |
| 5,753,385 A | | 5/1998 | Jankowski et al. | |
| 6,238,816 B1 | * | 5/2001 | Cable et al. | 429/425 |
| 6,946,209 B1 | * | 9/2005 | Israelson | 429/410 |
| 2003/0180602 A1 | * | 9/2003 | Finn et al. | 429/38 |
| 2003/0211375 A1 | * | 11/2003 | Ruhl | 429/30 |
| 2004/0086772 A1 | * | 5/2004 | Chianelli et al. | 429/40 |
| 2005/0074650 A1 | | 4/2005 | Sridhar et al. | |

(Continued)

OTHER PUBLICATIONS

Aguilar et al.; Sulfur-Tolerant Materials for the Hydrogen Sulfide SOFC; manuscript; 2004; A324-A326; Electrochemical and Solid State Letters 7 (10).

(Continued)

*Primary Examiner* — Krishnan S Menon
(74) *Attorney, Agent, or Firm* — Jason H. Foster; Kremblas & Foster

(57) ABSTRACT

Conveying gas containing sulfur through a sulfur tolerant planar solid oxide fuel cell (PSOFC) stack for sulfur scrubbing, followed by conveying the gas through a non-sulfur tolerant PSOFC stack. The sulfur tolerant PSOFC stack utilizes anode materials, such as LSV, that selectively convert $H_2S$ present in the fuel stream to other non-poisoning sulfur compounds. The remaining balance of gases remaining in the completely or near $H_2S$-free exhaust fuel stream is then used as the fuel for the conventional PSOFC stack that is downstream of the sulfur-tolerant PSOFC. A broad range of fuels such as gasified coal, natural gas and reformed hydrocarbons are used to produce electricity.

19 Claims, 6 Drawing Sheets

U.S. PATENT DOCUMENTS

2007/0259228 A1* 11/2007 Hartvigsen et al. ............ 429/20
2008/0138669 A1* 6/2008 Bayless et al. ................. 429/12
2011/0014526 A1* 1/2011 Gur .............................. 429/405

OTHER PUBLICATIONS

Aguilar; Sulfur-Tolerant Materials for the Hydrogen Sulfide Solid Oxide Fuel Cell; Thesis; 2004.

Aguilar et al.; A Solid Oxide Fuel Cell Operating on Hydrogen Sulfide (H2S) and Sulfur-Containing Fuels; Journal of Power Sources; 2004; 17-24.

Badwal, S.P.S.; Stability of Solid Oxide Fuel Cell Components; Solid State Ionics 143; 2001; 39-46.

Bayless, David J.; Adapting Planar Solid Oxide Fuel Cells for use with Solid Fuel Sources in the Production of Distributed Power.

Dees et al.; Interfacial Effects in Monolithic Solid Oxide Fuel Cells; symposium; 1989; 317-321.

Gamson et al.; Sulfur from Hydrogen Sulfide; Chemical Engineering Progress Journal 49; 1953; 203-215.

Geyer et al.; Investigations into the Kinetics of the Ni-YSZ-Cermet Anode of a Solid Oxide Fuel Cell; Electrochemical Proceedings vol. 97-18; 584-595.

Jiang et al.; Fuel Composition and Diluent Effect on Gas Transport and Performance of Anode-Supported SOFCs; manuscript; Journal of the Electrochemical Society, 150 (7); 2003; A942-A951.

Kirk et al.; A Hydrogen Sulfide Solid-Oxide Fuel Cell Using Ceria-Based Electrolytes; J. Electrochem. Soc., vol. 140, No. 12; 1993; 3494-3496.

Kohler et al.; Sulfur Oxidation Kinetics on Pt(111) at Low and High Sulfur Coverages; Surface Science Journal 136; 1984; 243-256.

Liu et al.; Performance of a Solid Oxide Fuel Cell Utilizing Hydrogen Sulfide as Fuel; Journal of Power Sources 94; 2001; 20-25.

Marina et al.; Thermal, Electrical, and Electrocatalytical Properties of Lanthanum-Doped Strontium Titanate; Solid State Ionics 149; 2002; 21-28.

Matsuzaki et al.; The Poisoning Effect of Sulfur-Containing Impurity Gas on a SOFC Anode: Part I. Dependence on Temperature, Time and Impurity Concentration; Solid State Ionics 132; 2000; 261-269.

Mukundan et al.; Sulfur Tolerant Anodes for SOFCs; Electrochemical and Solid-State Letters 7 (1); 2004; A5-A7.

Peterson et al.; Utilization of Hydrogen Sulfide in an Intermediate-Temperature Ceria-Based Solid Oxide Fuel Cell; J. Electrochem. Soc., vol. 145, No. 5; 1998; 1449-1454.

Pudmich et al.; Chromite/Titanate Based Perovskites for Application as Anodes in Solid Oxide Fuel Cells; Solid State Ionics 135; 2000; 433-438.

Pujare et al.; A Direct H2S/Air Solid Oxide Fuel Cell; J. Electrochem. Soc.; 1987; 2639-2640.

Pujare et al.; An Electrochemical Claus Process for Sulfur Recovery; J. Electrochem. Soc., vol. 136, No. 12; 1989; 3662-3678.

Steijns et al.; The Role of Sulfur Trapped in Micropores in the Catalytic Partial Oxidation of Hydrogen Sulfide with Oxygen; Journal of Catalysis 35; 1974; 11-17.

Suwanwarangkul et al; Performance Comparison of Fick's, Dusty-Gas and Stefan-Maxwell Models to Predict the Concentration Overpotential of a SOFC Anode; Journal of Power Sources 122; 2003; 9-18.

Trembly et al.; Effects of Coal Syngas and H2S on the Performance of Solid Oxide Fuel Cells: Single-Cell Tests; Journal of Power Sources 158; 2006; 263-273.

Yakabe et al.; Evaluation and Modeling of Performance of Anode-Supported Solid Oxide Fuel Cell; Journal of Power Sources 86; 2000; 423-431.

Yamamoto, Osamu; Solid Oxide Fuel Cells: Fundamental Aspects and Prospects; Electrochimica Acta 45; 2000; 2423-2435.

Yates et al.; Anode Materials for a Hydrogen Sulfide Solid Oxide Fuel Cell; Journal of the Electrochemical Society 146 (8); 1999; 2841-2844.

Yentekakis et al.; Chemical Cogeneration in Solid Electrolyte Cells; J. Electrochem. Soc., vol. 136, No. 4; 1989; 996-1002.

Zhu et al.; A General Mathematical Model for Analyzing the Performance of Fuel-Cell Membrane-Electrode Assemblies; Journal of Power Sources 117; 2003; 61-74.

* cited by examiner

SOLID OXIDE FUEL CELL PROCESS AND APPARATUS

CROSS-REFERENCES TO RELATED APPLICATIONS

This application claims the benefit of U.S. Provisional Application No. 60/786,640 filed Mar. 28, 2006.

STATEMENT REGARDING FEDERALLY-SPONSORED RESEARCH AND DEVELOPMENT

This invention was made with Government support under contract awarded by the United States Department of Energy. The Government has certain rights in the invention.

REFERENCE TO AN APPENDIX (Not Applicable)

BACKGROUND OF THE INVENTION

1. Field of the Invention

This invention relates generally to fuel cells and more particularly to fuel cell systems that can be used in sulfur environments.

2. Description of the Related Art

Fuel cells liberate electrochemical energy from fuel streams containing hydrogen and/or other gases. A particular type of fuel cell, known as a solid oxide fuel cell (SOFC), has the ability to produce energy from hydrocarbon fuels at efficiencies far greater than traditional combustion engines, potentially as high as 80% for integrated systems. The discovery of a feasible energy production process is very important, given that natural gas and oil reserves are at low levels and continue to diminish. Though coal is also a limited resource, very large quantities still exist in many countries, including the USA. Coal can be used as a fuel for SOFCs if it is gasified to form a fuel known as "coal syngas".

A diagram demonstrating how a typical SOFC works is shown in FIG. 1. Another simple diagram of a basic SOFC is shown in FIG. 2. Since SOFC are electrochemical devices, they consist of three main components: an anode, a cathode and an electrolyte. As shown in FIG. 1, available CO and $H_2$ in the fuel stream are utilized at the SOFC anode. $H_2$ oxidizes more readily than CO due to the faster diffusion rate of $H_2$ into the porous anode. The fuel stream reacts in the triple phase boundary (the area where the fuel, oxygen ions, and electrons produced by the oxidation are present) of the anode. The electrons produced by oxidation constitute the electrical power produced by the fuel cell. After reaching a power load, the electrons travel to the cathode of the SOFC where oxygen from air is reduced to oxygen ions ($O^{2-}$). The oxygen ions then travel across an electrolyte, such as yttria stabilized zirconia (YSZ), that only allows the passage of oxygen ions. The ions then complete the circuit when they reach the anode.

During operation, a fuel stream containing $H_2$ and/or CO flows over the anode, while the cathode is exposed to either oxygen or air. When a load is applied to the system, oxygen reduces at the cathode to form oxide ions as noted above and according to the following:

$$O_2 + 4e^- \rightarrow 2O^{2-} \tag{1}$$

These ions migrate through the electrolyte to the anode, where they react with the fuel stream components to produce an electrical charge according to the following:

$$2CO + 2O^{2-} \rightarrow 2CO_2 + 3e^- \tag{2}$$

$$2H_2 + 2O^{2-} \rightarrow 2H_2O + 4e^- \tag{3}$$

$H_2S$ is a colorless, poisonous gas that is present in gasified coal and can cause many problems throughout SOFC systems, most notably to the anode. The SOFC shown in FIG. 1 shows little to no resistance in $H_2S$-containing environments. The activity of a typical SOFC anode drops considerably after exposure to $H_2S$ concentrations as small as 2 ppm. In the presence of larger concentrations of $H_2S$, this effect can be irreversible.

Therefore, in order to use gasified coal as a fuel source for SOFCs, either the anodes in the SOFC must be tolerant to $H_2S$, or there must be no $H_2S$ present in the inlet fuel stream. The removal of $H_2S$ from fuel streams is expensive. Such costly fuel treatments to remove impurities as $H_2S$ prevent SOFC from competing with more traditional power generation methods. State-of-the-art sulfur tolerant anodes effectively react $H_2S$, but show poor results when attempting to oxidize $H_2$, making them inappropriate for power production.

$H_2S$ is typically removed during coal gasification by the Claus process, where a partial oxidation with air produces elemental sulfur and water. This process consists of two consecutive steps:

$$2H_2S + 3O_2 \rightarrow 2SO_2 + 2H_2O \tag{4}$$

$$2H_2S + SO_2 \rightarrow 3S + 2H_2O \tag{5}$$

The former reaction is carried out at temperatures nearing 1400 K as a non-catalytic combustion, while the latter reaction is a reversible catalytic process taking place over an equilibrium reactor train. The efficiency of this reaction scheme is limited by multiple side reactions, including the oxidation of sulfur:

$$S + O_2 \rightarrow SO_2 \tag{6}$$

and a reverse Claus process:

$$3S + H_2O \Leftrightarrow SO_2 + H_2S \tag{7}$$

The largest contemporary obstacles to industrial or distributed use of SOFC are their susceptibility to poisoning by $H_2S$ impurities and the necessary costs of fuel treatment to remove $H_2S$ from syngas. While SOFC have shown encouraging stability and performance in systems containing only $H_2$ and $H_2O$, it is costly and difficult to locate and/or produce large quantities of pure elemental hydrogen. The damage to SOFCs if the $H_2S$ is not removed is unacceptable.

Due to the high operating temperature of the SOFC, $H_2S$ can also thermally decompose:

$$H_2S \rightarrow \tfrac{1}{2}S_2 + H_2 \tag{8}$$

The elemental sulfur and hydrogen produced by this chemical reaction may further react in the electrochemical reactions $$H_2 + O^{2-} \rightarrow H_2O + 2e- \tag{9}$$

$$\tfrac{1}{2}S_2 + 2O^{2-} \rightarrow SO_2 + 4e- \tag{10}$$

where $E^0$ for the reactions described by Equations (11) and (12) are 1.185 and 0.883 V, respectively. The simultaneous presence of $H_2S$ along with $SO_2$ produced by the reaction described by Equation 12 at the SOFC anode may lead to their consumption via the reverse Claus process.

The contemporary standard for SOFC anodes is a metal such as Ni or Pt. These metals possess excellent catalytic activity toward $H_2$ and CO oxidation at the temperatures (~1000° C.) reached during SOFC operation. However, conventional SOFC anodes such as Ni or Pt are poisoned by $H_2S$ present in syngas, causing poor electrochemical performance and even irreversible system failure. For example, platinum catalyzes the oxidation of $H_2S$ to sulfur oxides at temperatures above 300° C. Researchers have examined the use of Pt as an anode in a SOFC utilizing an $H_2S$-containing fuel stream, but Pt anodes have poor longevity when used with $H_2S$-containing fuel streams due to the formation of PtS, which increases the interfacial resistance between the Pt anode and the YSZ electrolyte leading to detachment of Pt from YSZ. Fuel streams containing both 5% $H_2S$ (balance $H_2$) and pure $H_2S$ have been tested, and it was found that longer anode lifetimes were achieved when using the dilute $H_2S$ feed.

Prior studies utilizing Pt as a SOFC anode in $H_2S$-containing systems predominantly tested systems containing YSZ as the electrolyte. Such studies utilized ceria-based electrolytes in an effort to reduce the SOFC operating temperature. While low overpotentials and high current exchange densities were observed in such systems as in other Pt anode SOFC systems, the ceria electrolyte has been found to develop electronic conductivities in reducing environments and demonstrate poor long-term stability in a $H_2S$ environments. Corroborating the results of the previous researchers mentioned, the Pt anode demonstrated a steady loss in activity with time due to the formation of PtS.

Given that Pt anodes proved to be inappropriate for SOFC systems utilizing $H_2S$-containing feeds, attention was given to contemporary Ni/YSZ anode SOFCs. A study using impedance analysis and DC polarization showed extensive sulfur poisoning due to the formation of NiS during operation. Since NiS has a melting point below the operating temperature of SOFCs, Ni-based anodes are susceptible to melting during operation with $H_2S$-containing fuels. Differences in thermal expansion between Ni/YSZ and NiS can also prove problematic. Analogous to the results found for Pt anodes, it was found that the degree of sulfur poisoning on Ni/YSZ anodes is proportional to the total $H_2S$ content in the incoming fuel stream. Another study found that the polarization resistance for Ni/YSZ anodes doubled when a $H_2$ fuel stream containing 5% $H_2S$ was utilized, while yet another study found that sulfur poisoning on Ni/YSZ anodes became irreversible after exposure to 105 ppm $H_2S$ at 1273 K.

Due to the infeasibility of Pt and Ni-based SOFC anodes in $H_2S$ environments, researchers have turned their attention to anodes made of perovskite oxides, which is a term for compounds having the generic composition $ABO_3$. One study examined the properties of a wide range of perovskites based on lanthanum chromite ($La_{1-x}A_xCr_{1-y}B_yO_3$). While most of the materials tested somewhat fulfilled the requirements of an SOFC anode, none of the materials were found to have a combination of properties superior to Ni/YSZ. Poor conductivity, lacking activity toward hydrogen oxidation, and thermal expansions not matching those of YSZ or ceria-based electrolytes were among the disadvantages associated with using these materials as SOFC anodes.

Conventional studies of the properties of $La_xSr_{1-x}TiO_3$ (LST) found it to meet all requirements for SOFC anodes, and others successfully tested SOFCs utilizing LST anodes using fuel streams with concentrations of $H_2S$ ranging from 10 to 5000 ppm. These anodes showed little degradation over time and even showed an increase in activity when 5000 ppm $H_2S$ was present. This phenomenon was attributed to the SOFC oxidizing ~12% of the available $H_2S$, producing additional electricity.

LST anodes also oxidize other fuel gas species present in the fuel stream, such as $H_2$, along with $H_2S$, although the literature shows that LST does not have high electrocatalytic activity toward any fuel species. The overall electrocatalytic performance of LST anodes was noted in the literature to be far below that found using existing anode materials, such as Ni/YSZ. The maximum power density found using LST anodes is 175 mW/cm$^2$, while power densities of up to 1.8 W/cm$^2$ have been demonstrated by other contemporary systems.

More recent studies have shown that a perovskite known as lanthanum strontium vanadate ($La_xSr_yVO_3$ or LSV) is not only resilient to $H_2S$ when used as a SOFC anode in 0-10% $H_2S$ environments, but further shows excellent activity toward $H_2S$ oxidation. LSV, however, does not show strong activity toward oxidation of other fuel gas species.

Studies using a Pt anode were also carried out for comparison. Performance of SOFCs utilizing LSV anodes showed no significant deterioration during a 48 hour period of operation in $H_2S$ environments. Moreover, the performance of the LSV anode appeared to increase as $H_2S$ concentration increased.

BRIEF SUMMARY OF THE INVENTION

The invention is a solution to the problem of damage to conventional SOFC by $H_2S$ without the added cost of fuel treatment by taking advantage of the strengths of certain anode materials rather than attempting to overcome their known weaknesses. Thus, coal syngas can be used as a fuel for SOFCs if the levels of $H_2S$ present in coal can be accommodated by the SOFCs. The invention shows promise in making reformed fuel containing sulfur species a viable fuel source for energy production via SOFCs.

Though low grade thermal energy may be recovered from the Claus process, it is more desirable to replace the combustion furnace of the first step in fuel treatment with a $H_2S$/Air SOFC with a LSV anode, which oxidizes $H_2S$ electrochemically. This allows direct conversion of the energy released to electricity at efficiencies as high as 80% for integrated systems.

The electrochemical oxidation of $H_2S$ in a SOFC begins with the reaction of migrated oxide ions and $H_2S$, forming either elemental sulfur:

$$H_2S + O^{2-} \rightarrow \tfrac{1}{2}S_2 + H_2O + 2e- \tag{11}$$

or $SO_2$:

$$H_2S + 3O^{2-} \rightarrow SO_2 + H_2O + 6e- \tag{12}$$

where $E^0$ for the reactions described by Equations 11 and 12 are 0.801 and 0.855 V, respectively. It has been found that the reaction of Equation 12 predominates in the sulfur-tolerant SOFC, especially at high levels of fuel utilization.

Although LSV anodes realize power densities of only 140 mW/cm$^2$, comparing poorly with contemporary, sulfur-intolerant SOFC anodes, numerous observations suggest that the LSV anode preferentially oxidizes $H_2S$, even in the presence of a large amount of orthodox SOFC fuel gases such as $H_2$. The ability of the LSV anode preferentially to oxidize $H_2S$ while leaving behind benign fuel gas constituents makes it a seemingly excellent choice for "scrubbing" $H_2S$ from a fuel gas stream while recovering electricity from the process. The gas constituents remaining in the fuel stream, such as $H_2$, CO, $CH_4$, etc. are then more efficiently oxidized by contemporary sulfur-intolerant SOFCs downstream from the LSV anode SOFC.

The process includes conveying gas containing sulfur (as harmful sulfur species) through a sulfur tolerant planar solid oxide fuel cell (PSOFC) stack for sulfur scrubbing, followed by sending the gas through a non-sulfur tolerant PSOFC stack. The sulfur tolerant PSOFC stack utilizes anode materials, such as LSV, that selectively convert $H_2S$ present in the fuel stream to other non-poisoning sulfur compounds. The remaining balance of gases remaining in the completely or near $H_2S$-free exhaust fuel stream is then used as the fuel for the conventional PSOFC stack that is downstream of the sulfur-tolerant PSOFC. In this manner, a broad range of fuels such as gasified coal, natural gas and reformed hydrocarbons are used to produce electricity.

Utilizing the invention rather than conventional coal combustion will effectively reduce the total amount of $CO_2$ emitted to the environment while reducing fuel costs. The process produces only negligible amounts of $NO_x$ since combustion reactions are not used, while the capture efficiency of other pollutants such as $SO_x$ and particulate matter are greatly increased when a laminar flow electrostatic precipitator is used for the capture of these pollutants.

The invention thus includes a process for using a fuel derived from "coal syngas" which contains $H_2S$. Syngas is an attractive option for SOFC fuel due to the abundance of coal in the US. Current estimates place the amount of coal produced in the US at 1.1 billion short tons each year. Moreover, the production, storage and transportation of conventional SOFC fuels such as hydrogen are both inefficient and dangerous. Coal, conversely, has been mined, stored and shipped worldwide for centuries.

Figure 1:
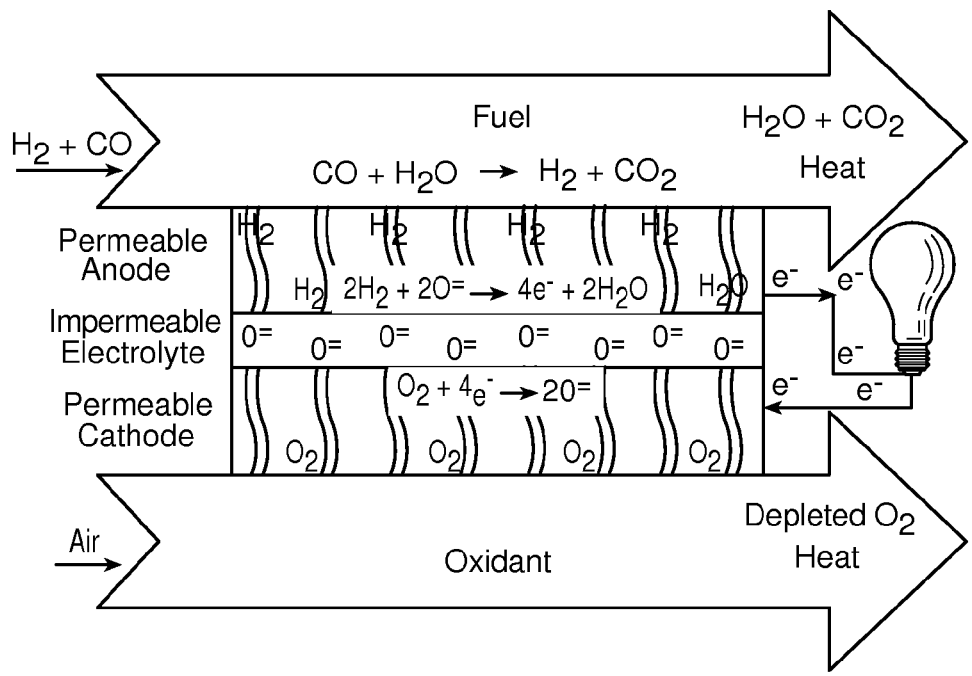
FIG. 1 is a schematic illustration of a conventional solid oxide fuel cell.
Figure 2:
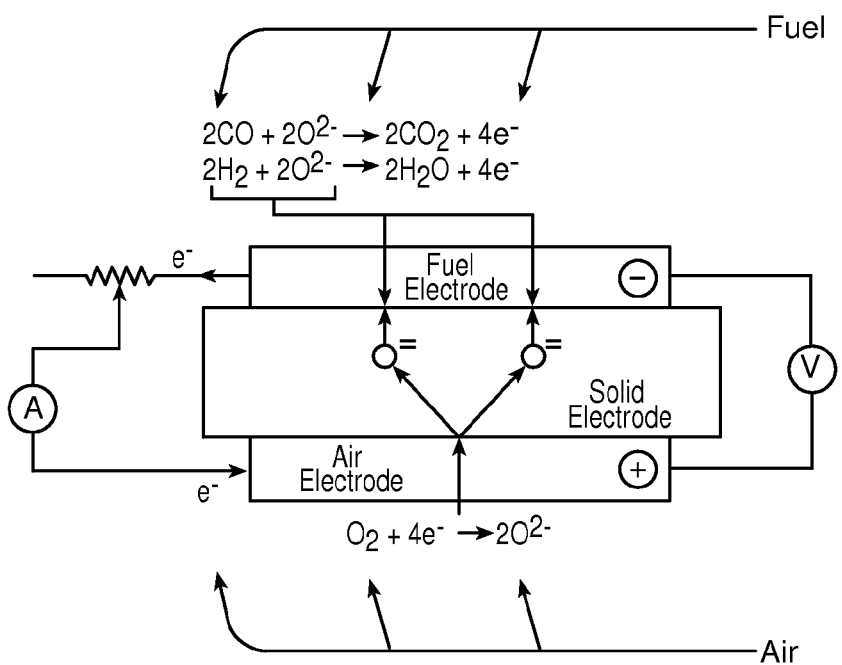
FIG. 2 is a schematic illustration of a conventional solid oxide fuel cell.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 7:
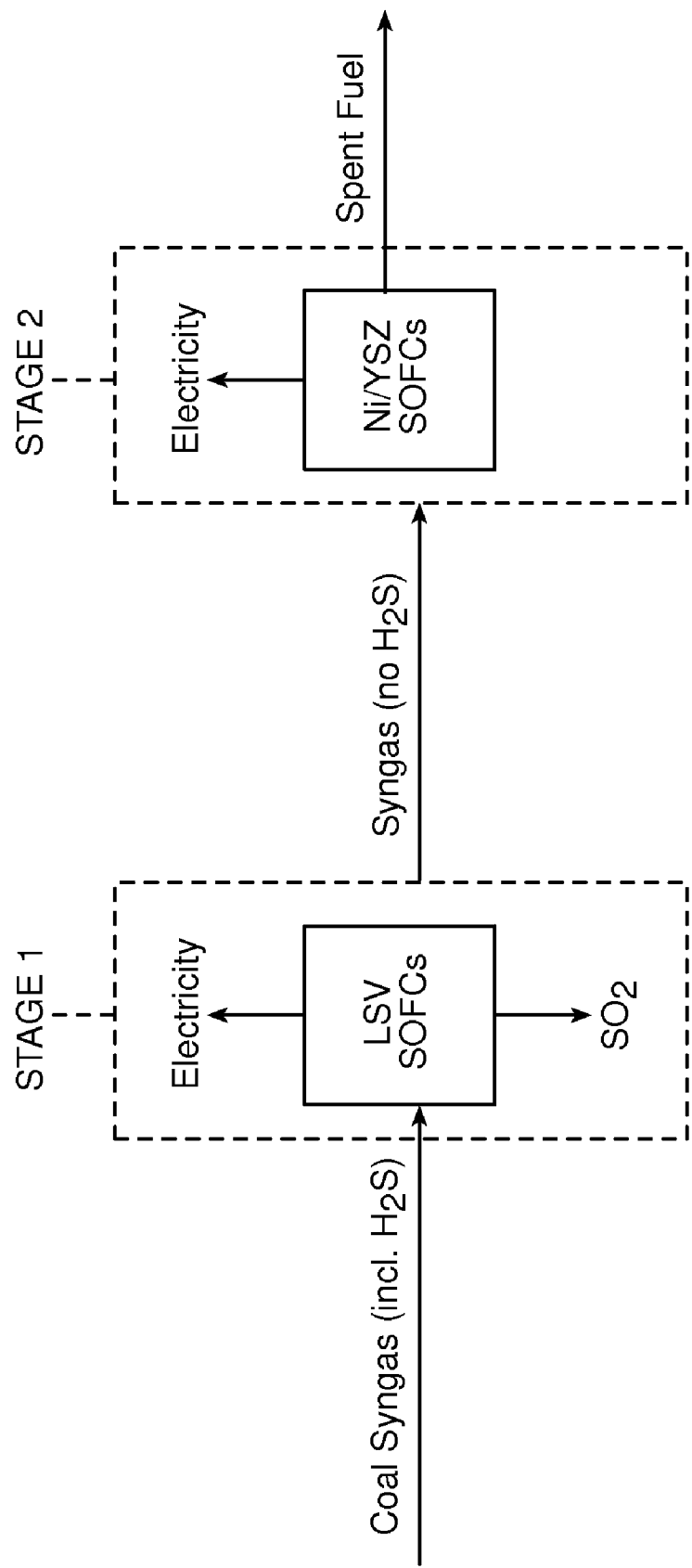
FIG. 7 is a schematic illustration of a system according to the present invention in which the first stage is a sulfur-tolerant SOFC and the second stage is a sulfur-intolerant SOFC.
Figure 8:
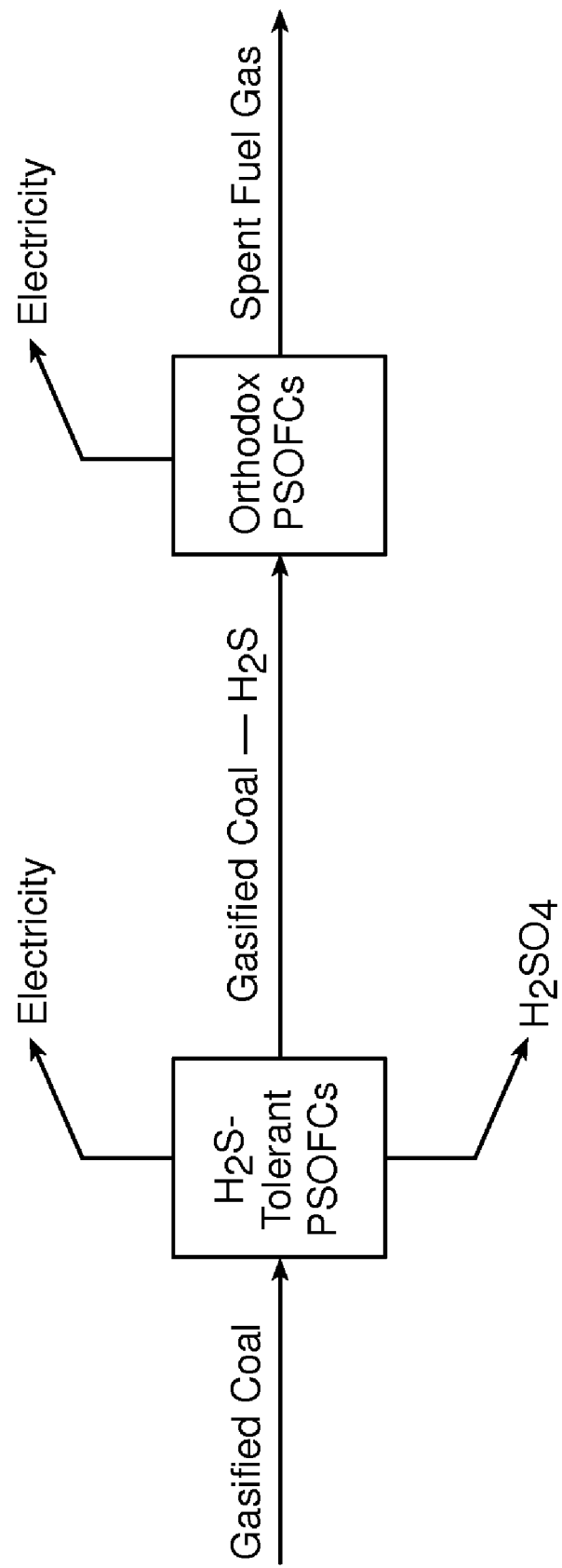
FIG. 8 is another schematic illustration of a system according to the present invention in which the first stage is a sulfur-tolerant SOFC and the second stage is a sulfur-intolerant SOFC.

A solution to the problem of sulfur in the gas stream of SOFCs has been developed utilizing a two-stage reaction process, which is shown in FIGS. 7 and 8. The first stage includes a fuel cell stack utilizing sulfur tolerant anodes, while the second stage includes conventional fuel cells. The fuel gas flows first through the first stage SOFC, which preferably oxidizes at least the sulfur-containing species. The gas then exhausts from the first stage and flows downstream into the second stage, which has higher energy production levels, but cannot tolerate any substantial amount of sulfur in the fuel gas stream. Thus, after the fuel gas has been "scrubbed" of sulfur by the first stage, it flows downstream to the second stage, which produces a substantial amount of energy.

Figure 5:
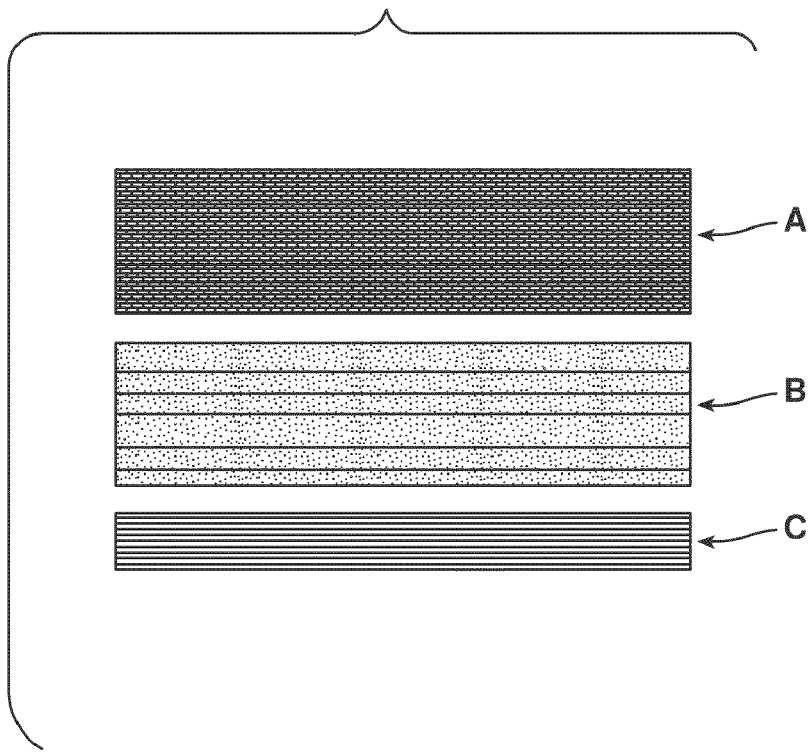
FIG. 5 is a schematic illustration of a SOFC with a sulfur-tolerant anode, where A is LSV, LST or other such sulfur-tolerant anode materials; B is the combination of the material used in layer A along with an electrolyte such as YSZ or GDC; and C is YSZ or GDC.
Figure 6:
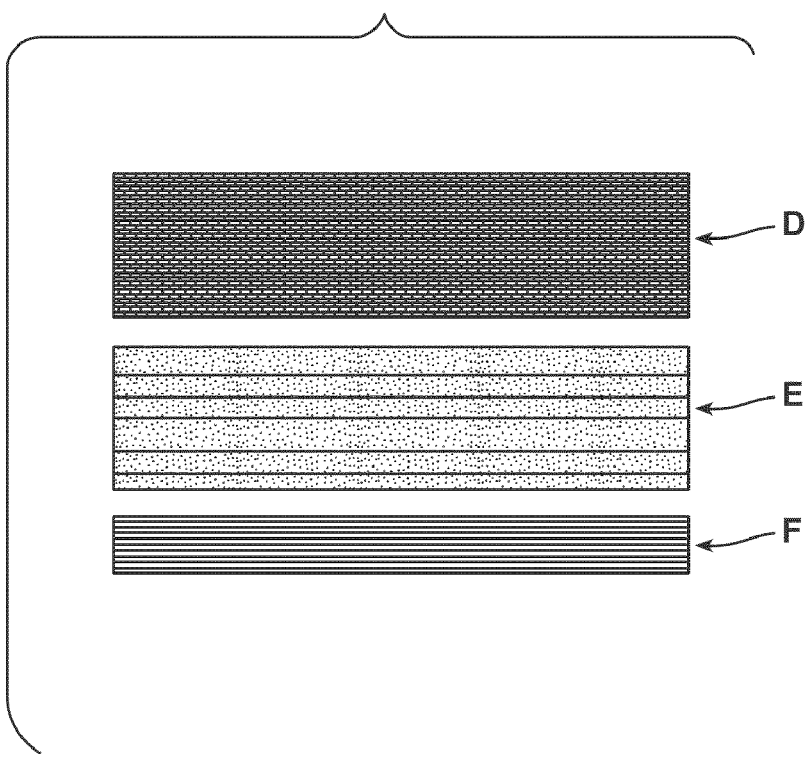
FIG. 6 is a schematic illustration of a SOFC with a sulfur-intolerant anode, where D is a catalyst such as nickel (Ni); E is the combination of the catalyst used in layer D along with an electrolyte such as YSZ or GDC; and F is YSZ or GDC.

Diagrams of the cells used in each stack are shown in FIGS. 5 and 6. The anode in the sulfur-tolerant stack utilizes a catalytic material with high activity toward the electrochemical oxidation of $H_2S$, such as, but not limited to, lanthanum strontium vanadium oxide (LSV), lanthanum strontium tin oxide (LST), etc. as disclosed in International Application No. PCT/US/2006010620, International Publication No. WO 2006/102525 A2, which is incorporated herein by reference. The catalyst used combines a high affinity toward the oxidation of $H_2S$ along with sustainable behavior using coal syngas as fuel. At high levels of fuel utilization, the preferred product of the reaction utilizing $H_2S$ is $SO_4$. Thus, $H_2SO_4$, which has a commercial value, can be produced by the process. The outlet gas stream of the first SOFC stack is free of or containing very low concentrations of $H_2S$, such as a few parts per million (ppm). The first stage preferably selectively oxidizes all $H_2S$ present in the coal syngas fuel stream.

The outlet gases from the first stage are then conveyed downstream to the second stage. The second stage utilizes more conventional, sulfur-intolerant fuel cell catalyst materials, such as, but not limited to, Ni/YSZ, Ni/gadolinium doped cerium oxide (GDC), and others. Since most if not all $H_2S$ has been removed (by the first stage) from the gas stream that enters the second stage, the SOFCs used in the second stage show enhanced stability. The combination of these two stages allow the system to utilize fuels containing sulfur species, and this dramatically improves the viability of SOFC technology for distributed generation purposes.

The two-stage reaction system has been designed to utilize a syngas feed. A simple schematic of the proposed system is shown in FIG. 7. The SOFCs in the first stage utilize LSV anodes. These SOFCs effectively "scrub" any $H_2S$ present in the syngas stream via electrochemical oxidation. The outlet gases from this LSV SOFC are fed to another SOFC utilizing conventional Ni anodes. Thus, with no $H_2S$ remaining in the fuel stream, the Ni anodes more effectively oxidize the remaining fuel species by avoiding SOFC performance degradation and improving system longevity.

The invention uses two different types of SOFC anodes—one that is active toward $H_2S$ oxidation, the other that is active toward syngas oxidation—in separate SOFCs placed in series in a gas flow path. In this way, the two SOFC units are able to oxidize a syngas stream containing $H_2S$ impurities.

It is necessary that the material used as the SOFC anode in the second stage meet a number of stringent requirements. Catalytic activity towards reactant oxidation as well as high electronic conductivity is required to minimize polarization losses. The porosity of the material must support effective gas transport while possessing good chemical and mechanical compatibility with other parts of the SOFC. Stability over a wide oxygen partial pressure range is necessary due to the differences in oxidizing conditions at the fuel inlet and outlet. For fuel streams containing only $H_2$ and/or CO, Ni/yttria stabilized zirconia (YSZ) is the standard anode of choice as it satisfies most of these requirements.

Cathodes used in the second stage of the SOFC system must also have thermal expansion coefficients that closely match electrolytes to avoid mechanical problems during SOFC operation. In addition, chemical stability, low interactions with electrolyte, high electrocatalytic activity and adequate electronic and ionic conductivity are desired in an ideal SOFC cathode. The current orthodox choice for cathode material in SOFCs operating near 1000° C. is strontium-doped $LaMnO_3$ (LSM), which represents a compromise of the above requirements.

For the electrolyte layer, three properties are necessary: high conductivity, little electronic conductivity and the ability to conduct oxygen ions. YSZ is the industry standard, as it boasts high conductivity above 700° C., negligible electronic conductivity below 1500° C. and is an oxygen ion conductor. An alternative electrolyte, gadolinium doped ceria (GDC) has greater conductivity than YSZ while also conducting oxygen ions, but has been reported to develop electronic conductivity and is partially reduced in $H_2$ at temperatures above 600° C.

Button cells containing sulfur-tolerant LSV anodes are used with a coal syngas feed to oxidize $H_2S$ present in the fuel stream. These cells, illustrative of the types of cells that can be used in the fuel stream, are shown in FIGS. 5 and 6.

The process and apparatus electrochemically "polish" $H_2S$ from coal syngas. Lanthanum strontium vanadate (LSV) anodes are used in planar solid oxide fuel cells to effectively "scrub" any $H_2S$ present in the hot syngas fuel stream via electrochemical oxidation, while leaving behind fuel components such as $H_2$ and CO. The outlet gases from this LSV SOFC stage are available for combustion or reaction with another SOFC stage utilizing conventional Ni anodes. With no $H_2S$ remaining in the fuel stream, the Ni anodes are able to effectively oxidize the rest of the syngas while avoiding SOFC performance degradation and improving system longevity.

Figure 3:
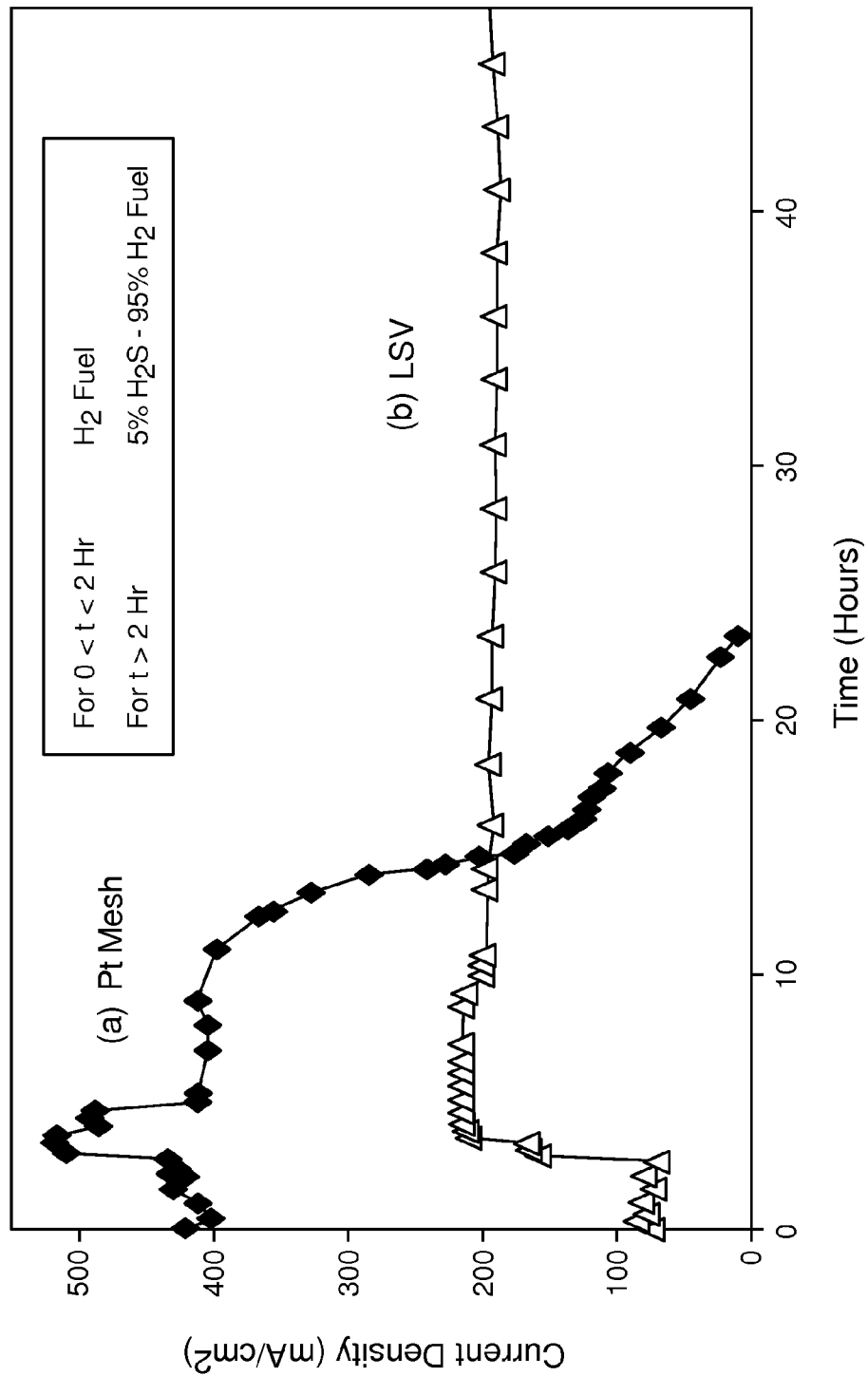
FIG. 3 is a graphical illustration of the relative performances of SOFCs, one with a platinum anode and the other with a LSV anode, in an $H_2S$ containing fuel blend with $V_{cell}$=0.44V; T=1273K; fuel flow rate=14 sccm.

The feasibility of the oxidation of $H_2S$-containing fuel streams by LSV SOFCs has been demonstrated. FIG. 3 shows a comparison of the performances of Pt and LSV anodes in $H_2S$-containing environments. In this study, humidified $H_2$ was the fuel stream for the first 2 hours of the test. After 2 hours, the fuel stream was changed to a 5% $H_2S$/95% $H_2$ mixture. Although the Pt anode failed quickly after the introduction of $H_2S$ into the SOFC fuel stream, the SOFC utilizing LSV anodes actually showed an improvement in performance. It is theorized that this phenomenon is attributable to the additional electricity produced from the electrochemical oxidation of $H_2S$.

Figure 4:
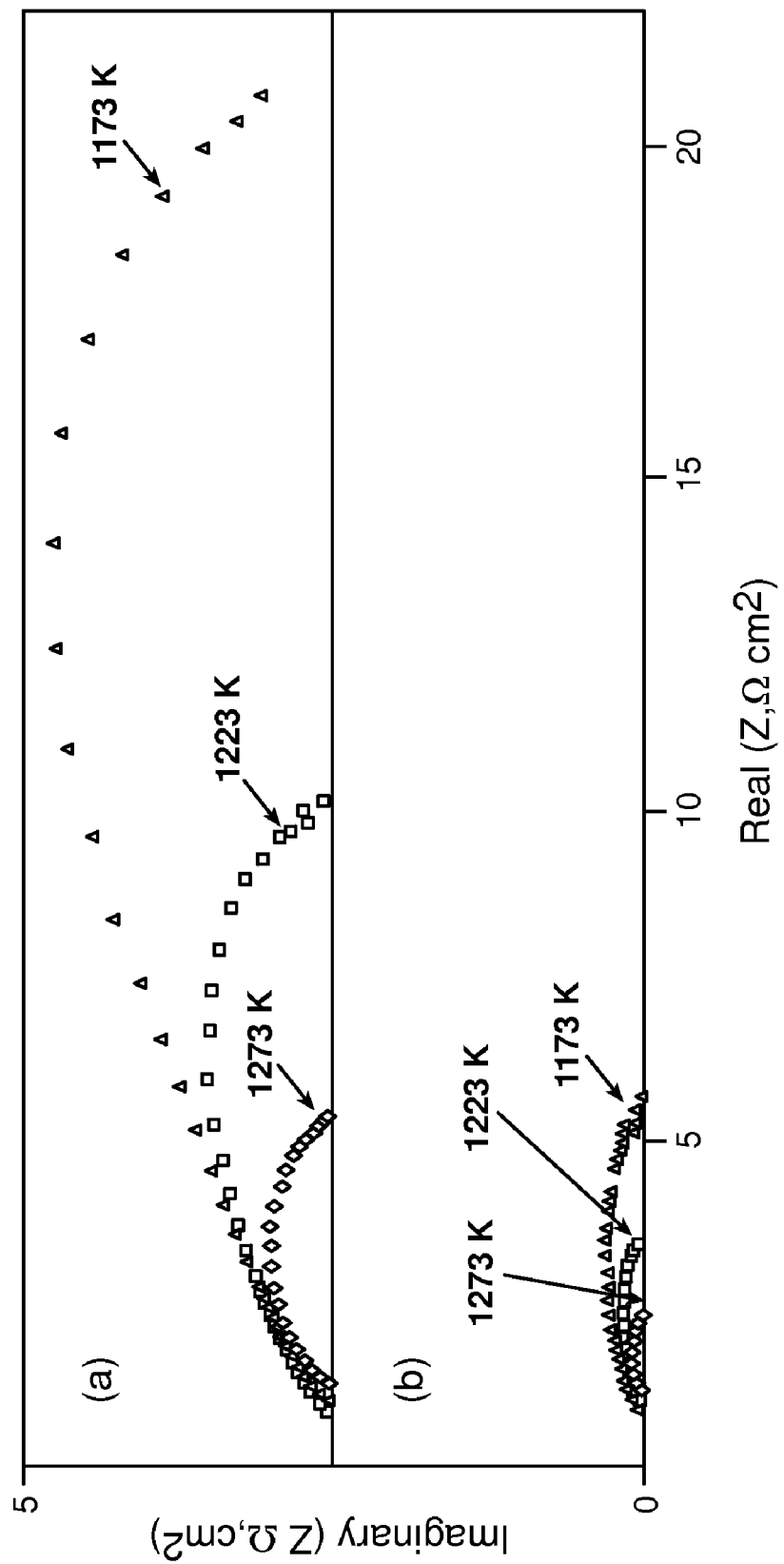
FIG. 4 is a graphical illustration of the impedance spectra for a LSV SOFC in 100% $H_2$ and 10% $H_2S$/90% $H_2$ fuel gas.

FIG. 4 shows the impedance spectra for a LSV SOFC in both $H_2$ and 10% $H_2S$/90% $H_2$ environments. It can be seen that SOFC resistances were reduced by nearly 70% once the $H_2S/H_2$ fuel blend was introduced to the system. This rapid transition was also found to be fully reversible. The authors concluded that the reduction in overall polarization resistance was due to easier charge transfer processes at the LSV anode upon introduction of the $H_2S/H_2$ fuel blend, and further claim this to be an indication of the preferential oxidation of $H_2S$ over $H_2$ at the LSV anode.

The experimental syngas feed is comprised of 40 mole % CO, 26.3 mole % $H_2$, 33.7% $N_2$, 300 ppm $H_2S$ and a relative humidity of 2% in order to approximate the average formulation for syngas derived from Pittsburgh No. 8 coal. Operating temperature ($T_o$) and electrolyte type (E) of the SOFC as well as porosity ($\epsilon$) of the SOFC anode play a large role in cell performance. Operating temperature of the LSV SOFC has been tested in the range of 1173 K to 1273 K when utilizing $H_2S/H_2$ or $H_2S/N_2$ feeds.

It has been shown experimentally by others that, starting with a fuel gas containing 5% $H_2S$ and 95% $CH_4$, a product gas (the gas downstream of the sulfur-tolerant SOFC) contained the following amounts of $H_2S$ after flowing through a SOFC having LSV anode material at the current densities (i) indicated:

| Species | i = 0 | i = 160 mA/cm$^2$ | i = 400 mA/cm$^2$ |
| --- | --- | --- | --- |
| $H_2$ | 32.86% | 20.79% | 12.09% |
| CH4 | 63.74% | 71.27% | 76.87% |
| $H_2O$ | 1.52% | 5.67% | 6.87% |
| $H_2S$ | 1.37% | 1.12% | 2.72% |

Experiments performed on a LSV prototype with 30% fuel utilization and i=100 mA/cm$^2$, showed that 57% of the $H_2S$ was converted to materials that would not damage the anode. At i=350 mA/cm$^2$, 41% of the $H_2S$ was converted. Clearly in all cases, LSV ($La_{0.7}Sr_{0.3}VO_3$) is highly selective to $H_2S$. However, as power density increases, the reaction rates tend to move back towards higher utilization of $H_2$ or other fuel sources, not $H_2S$. Thus, the experiments show the viability of the system.

Although the system described herein describes gaseous fuel, it will become apparent that a liquid fuel can be used. Thus, suitable fuels in any fluidic (gas or liquid) form can be used with the present invention. Of course, other modifications can be made to the embodiments described above. For example, a plurality of SOFC can be mounted in series or in parallel within the first or second stages described above.

The term "sulfur-tolerant" is defined herein as being substantially unharmed by exposure to significant amounts of sulfur-containing molecules. Likewise, "sulfur-intolerant" is defined herein as being substantially harmed by exposure to significant amounts of sulfur-containing molecules. Something is "harmed" if its power density is diminished by more than about 25%.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:
1. A system for converting chemical energy in a fluid fuel, that contains sulfur and flows along a fuel path, to electrical energy, the system comprising:
(a) a sulfur-tolerant solid oxide fuel cell with an anode disposed in the fuel path for generating electricity and converting the sulfur-laden fluid fuel to a substantially sulfur-free fluid fuel in the fuel path downstream of the sulfur-tolerant solid oxide fuel cell; and

(b) a sulfur-intolerant solid oxide fuel cell with an anode disposed in the fuel path spaced downstream of the sulfur-tolerant solid oxide fuel cell for generating electrical energy from the substantially sulfur-free fluid fuel without substantial damage caused by sulfur.

2. The system in accordance with claim 1, wherein the sulfur-intolerant solid oxide fuel cell oxidizes molecules in the fluid fuel that do not contain sulfur.

3. The system in accordance with claim 1, wherein the sulfur-tolerant solid oxide fuel cell oxidizes sulfur-containing molecules in the fluid fuel.

4. The system in accordance with claim 3, wherein the sulfur-intolerant solid oxide fuel cell anode is made of Ni and YSZ.

5. The system in accordance with claim 3, wherein the sulfur-intolerant solid oxide fuel cell anode is made of Ni and GDC.

6. The system in accordance with claim 4, wherein the sulfur-tolerant solid oxide fuel cell anode is made of LSV.

7. The system in accordance with claim 5, wherein the sulfur-tolerant solid oxide fuel cell anode is made of LSV.

8. The system in accordance with claim 4, wherein the sulfur-tolerant solid oxide fuel cell anode is made of LST.

9. The system in accordance with claim 5, wherein the sulfur-tolerant solid oxide fuel cell anode is made of LST.

10. A method of converting chemical energy into electrical energy, the method comprising:
  (a) conveying a fluid fuel containing sulfur along a fuel path in which an anode of a sulfur-tolerant solid oxide fuel cell is disposed; and then
  (b) the sulfur-tolerant solid oxide fuel cell generating electricity and converting the sulfur-laden fluid fuel to a substantially sulfur-free fluid fuel in the fuel path downstream of the sulfur-tolerant solid oxide fuel cell; and then
  (c) conveying the substantially sulfur-free fluid fuel downstream from the sulfur-tolerant solid oxide fuel cell along the fuel path in which an anode of a sulfur-intolerant solid oxide fuel cell is disposed; and then
  (d) the sulfur-intolerant solid oxide fuel cell generating electrical energy from the substantially sulfur-free fluid fuel without substantial damage caused by sulfur.

11. The method in accordance with claim 10, further comprising the step of the sulfur-intolerant solid oxide fuel cell oxidizing molecules in the fluid fuel that do not contain sulfur.

12. The method in accordance with claim 10, further comprising the step of the sulfur-tolerant solid oxide fuel cell oxidizing sulfur-containing molecules in the fluid fuel.

13. The method in accordance with claim 12, wherein the sulfur-intolerant solid oxide fuel cell anode is made of Ni and YSZ.

14. The method in accordance with claim 12, wherein the sulfur-intolerant solid oxide fuel cell anode is made of Ni and GDC.

15. The method in accordance with claim 13, wherein the sulfur-tolerant solid oxide fuel cell anode is made of LSV.

16. The method in accordance with claim 14, wherein the sulfur-tolerant solid oxide fuel cell anode is made of LSV.

17. The method in accordance with claim 13, wherein the sulfur-tolerant solid oxide fuel cell anode is made of LST.

18. The method in accordance with claim 14, wherein the sulfur-tolerant solid oxide fuel cell anode is made of LST.

19. The method in accordance with claim 10, further comprising the step of producing $H_2SO_4$.

\* \* \* \* \*